Patented June 5, 1945

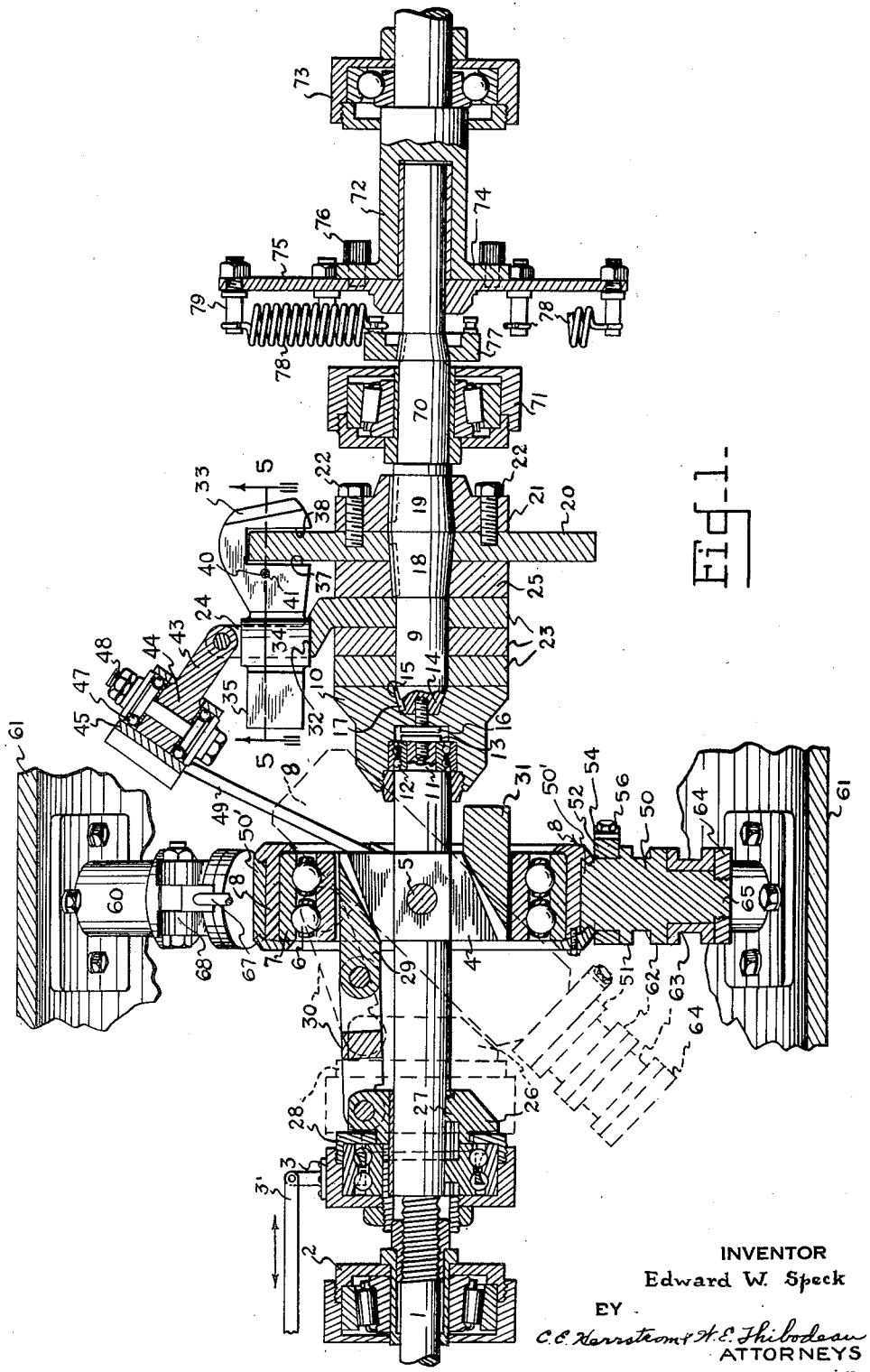

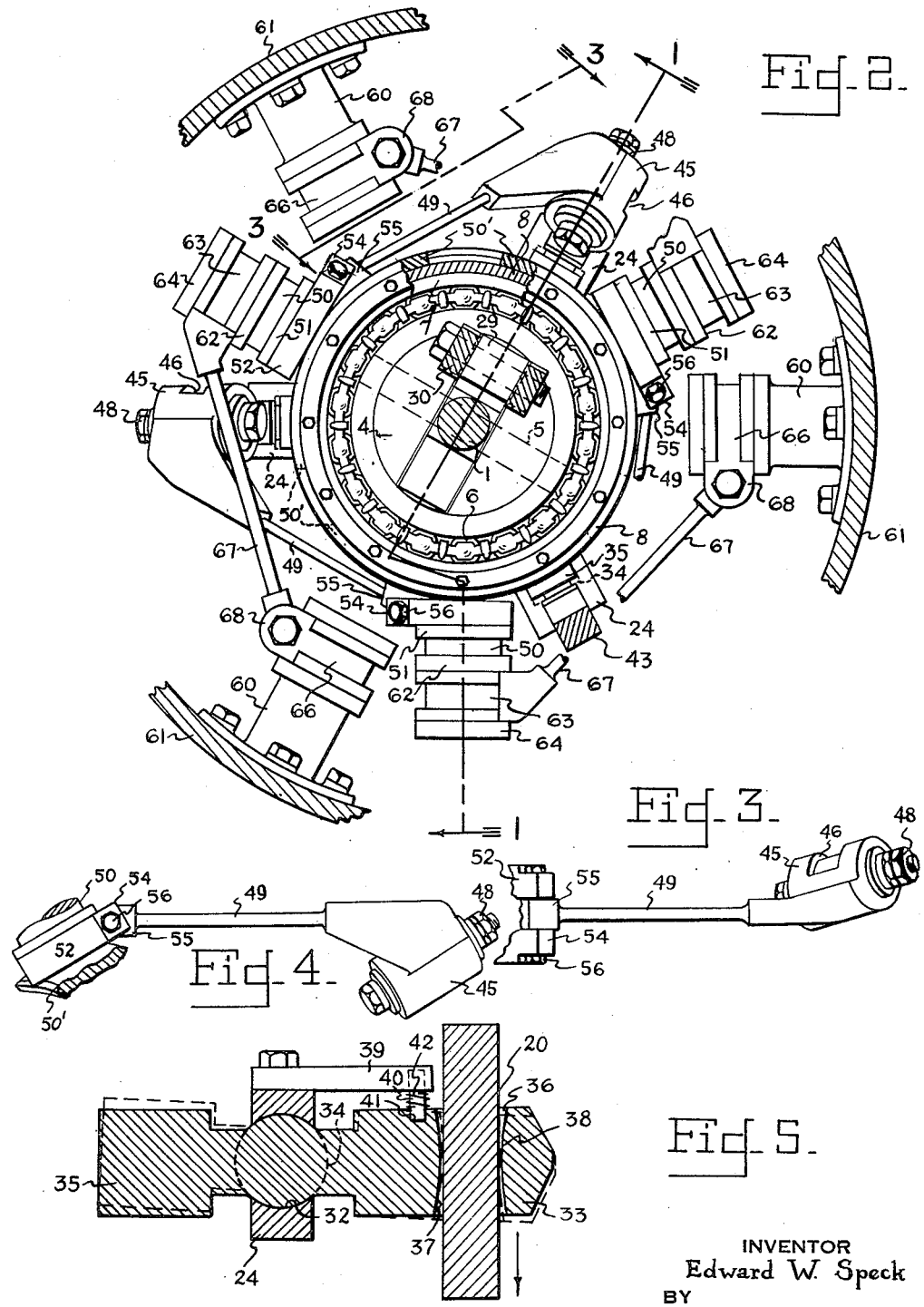

2,377,385

UNITED STATES PATENT OFFICE 2,377,385

VARIABLE TRANSMISSION

Edward W. Speck, Cleveland, Ohio

Application August 6, 1943, Serial No. 497,562

18 Claims. (Cl. 74—123)

(Granted under the act of March 3, 1883, as amended April 30, 1928; 370 O. G. 757)

The invention described herein may be manufactured and used by or for the Government for governmental purposes, without the payment to me of any royalty thereon.

The present invention pertains to an infinitely variable transmission of the variable throw type. The object of the invention is to provide more efficient and comparatively simple mechanism of this character, wherein a wabble plate is caused to rotate a driven shaft co-axial therewith. The previous devices of this general character are subject to two objections. First, each revolution of the wabble plate produces only one impulse on the driven shaft. Second, the linkage between the wabble plate and the driven shaft is highly complicated.

In the present invention the linkage consists of a connecting rod having its ends journalled respectively to the wabble plate and to a member carrying a claw which grips and drives a disk on the driven shaft. The use of a rigid connecting rod between the wabble plate and the claw is made possible by a unique relation of the journalled ends as will be described. Due to the compactness of this construction, several such units may be provided between the wabble plate and the driven shaft so that the latter receives several impulses on each rotation of the wabble plate.

An illustrative embodiment of the invention is shown in the accompanying drawings, in which like characters are employed to designate corresponding parts and in which:

Figure 1 is a longitudinal section of the transmission, on the line 1—1 of Figure 2;

Figure 2 is a section on the line 2—2 of Figure 1;

Figure 3 is a detail plan view on the line 3—3 of Figure 2;

Figure 4 is another elevation of the same detail viewed from another direction, and Figure 5 is a section on the line 5—5 of Figure 1.

In Figures 1 and 2 is shown a drive shaft 1 made in several sections if desired and supported in suitable bearings 2 and 3. At a suitable point on the shaft is secured the block or hub 4 of a wabble plate by means of a pin 5. The periphery of the hub is circular and carries a ball bearing 6 on the outer race 7 of which is mounted a channel ring 8 for a purpose that will presently be described.

In line with drive shaft 1 is an intermediate driven shaft 9, and between the shafts is a supporting block 10. The reduced end 11 of the shaft 1 is received in a bearing 12 fitted in the block and held by a headed screw 13. The adjacent end 14 of the shaft 9 is conical and is held in a similarly shaped socket 15. The block 10 is secured to the shaft 9 by a headed screw 16. The end 14 of the shaft 9 is also preferably keyed to the block 10 at 17.

The shaft 9 is also formed with a pair of conical sections 18 and 19 positioned base to base. On the section 18 is fitted a circular drive plate 20 secured to a hub 21 on the section 19 by means of bolts 22.

On the shaft 9, between the portions 14 and 18 thereof, is rotatably mounted a series of rings 23 from each of which extends an arm 24. Inasmuch as the arms are substantially identical, only one of them will be described in detail. A spacer 25 is fitted on the section 18 between the plate 20 and the nearest ring 23.

Between the bearing 3 and the hub 4 is a block or collar 26 splined on the shaft 1 at 27. The collar is fastened into the bearing 3 by suitable means such as a threaded member 28 and slides with the collar. The collar is connected to a lug 29 extending from the hub 4 by a link 30 hinged to both parts. The other side of the hub is counterweighted at 31.

The shaft 1 is driven from an internal combustion engine and its rotation is transmitted to the hub 4 of the wabble plate by the pin 5. The angularity of the wabble plate is determined by the longitudinal position of the collar 26 on the shaft 1, and this position is set either by a manual device 3' or a torque controlled device, neither of which is deemed to require detailed illustration. The non-rotating ring 8 of the wabble plate drives the disk 20 through mechanism associated with the arms 24, as will presently be described.

As shown in Figure 5, each arm 24 is formed with a cylindrical cavity 32 on an axis parallel to the plane of the disk 20. On each arm is mounted a claw 33 by means of a cylindrical hub or plug 34 rotatably fitted in the cavity 32. The body of the claw may be counterweighted at 35. The claw has a slot 36 receiving the disk 20 and having opposed convex walls 37 and 38 adapted to engage the surfaces of the disk as will presently be shown. To the arm 24 is secured a finger 39 carrying a pin 40 extending into a recess 41 in the claw. A spring 42 surrounds the pin and exerts pressure against the claw to release it from the disk in one direction, although the disk is engaged and driven when the claw moves in the direction of the arrow.

The outer end of each arm 24 has secured thereto an angular extension 43, as shown in Figure 1, preferably made as a separate piece for the purpose of assembly. The extension is formed with a cylindrical hub 44 on which is rotatably mounted a hollow cylinder 45 having a slot 46 to accommodate the lateral portion of the extension. Ball bearings 47 are retained on the ends of the hub 44 by a suitable assembly 48 and engage the inner wall of the cylinder 45. Each cylinder 45 is formed with a connecting rod 49 angular to the axis of the cylinder in two planes, as shown in Figures 3 and 4. In Figure 4 the rod is viewed on a horizontal line perpendicular thereto. The rod is adapted for connection to the wabble plate as will now be shown.

On the channel ring 8 at equal intervals are mounted a number of stems 50 by means of shoes 50' slidably received in the ring. Each stem has a collar 51 spaced a short distance from the ring. At the inner side of the collar, a split ring 52 is mounted on the stem and is retained at its other side by a disk 53 clamped against the ring 8. The spaced ends of the ring 52 are formed with lugs 54, and between the lugs is secured the remaining end of a connecting rod 49 which is preferably squared at 55 and secured by a bolt and nut assembly 56 through the lugs.

In the operation of the device as thus far described, it will be seen that actuation of the claws 33 is produced by thrust on the connecting rods 49. In the position shown in full lines of Figure 1, the wabble plate has no lateral movement during rotation and hence there is no thrust in the connecting rods. When the wabble plate takes an angular position relatively to the shaft 1, as shown in broken lines, either by a manual adjustment or automatically as previously stated, the rods 49 are successively displaced lengthwise because of the familiar wabble plate action. The pivotal mounting of each rod at both ends converts this motion into an oscillatory arcuate movement of the arms 24 and claws 33 about the shaft 9 as an axis.

For free movement of the rods without undue binding, it is preferred that the axes of the journalled ends of each rod form a right angle, with its vertex in the center of the wabble plate. In other words, the projection of the axis of the cylinder 45 intersects the center of the wabble plate and forms a right angle with the axis of the stem 50 supporting the same rod.

On one half cycle of the oscillation, each claw 33 rides freely on the disc 20 because of the freeing action of the spring 42, it being understood that all of these springs exert pressure on their respective claws in the same direction. On the other half of the cycle, each claw binds the disc 20 between the convex walls 36 and 37 and drives it in the direction of the arrow in Figure 5.

In the embodiment shown there are three claws with the corresponding rods 49 and stems 50, the latter being equally spaced about the ring 8. The claws are equally spaced around the shaft 9 when the wabble plate is in the neutral position as shown in Figure 1. This spacing changes with a change in angularity of the wable plate, and in such cases two or more claws may be in motion in the same direction at the same time although not simultaneously in the same parts of their respective cycles. In that event the faster moving claw on the drive stroke grips the disc and draws it freely through the slower claw. The slip occurs in the slower claw since the relative movement is in the free direction permitted by the spring 42.

When the wabble plate is at other than a right angle to the shaft 1, each of the stems 50 describes a figure eight on a horizontal axis. This movement results in non-uniform velocity of the corresponding rod 29 and claw 33. The figure eight path may be converted to a simple arcuate path in one plane by the guide means shown in Figures 1 and 2.

This mechanism includes, for each stem 50, an arbor 60 suitably fastened to the transmission housing 61. The arbors are spaced from the corresponding stems 50 and lie in the vertical plane of the wabble plate, equidistantly around the axis of the shaft 1. Each stem 50 is formed with another collar 62 outward from the collar 51 and engaged by a split ring 63 rotatable on the stem. The ring 63 is retained by a nut 64 threaded on the reduced tapped outer end 65 of the stem.

A similar ring 66 is mounted in like manner on the corresponding arbor 60 as shown in Figure 2. A rod 67 extends rigidly from a ring 63 and is secured rigidly between ears 68 extending from the corresponding ring 66. In the oscillation of the wabble plate, the rod 67 swivels on the axes of the stem 50 and the arbor 60. In an angular position of the wabble plate, each stem 50 describes an arc in a plane passing through the shaft 1, since the lateral components of the figure eight movement are translated into oscillation of the shoes 50' in the channel ring 8.

It is preferred that a resilient coupling be incorporated in the drive in order to dampen the intermittent impulses on the disc 20 by the claws 33. For this purpose the driven shaft 9 is extended at 70 and mounted in a suitable bearing 71. A final driven shaft 72 is fitted loosely over the extension 70 and also mounted in a suitable bearing 73. One end of the shaft 72 is formed with a flange 74 engaged by a coupling plate 75 loosely mounted on the extension 70 and secured to the flange by screws 76. A hub 77 is fastened on the extension 70 and connected by coil springs 78 to a circular series of pins 79 carried by the plate 75 and equidistantly spaced. The drive between the shafts 70 and 72 is through the hub 77, springs 78, pins 79 and plate 75 to dampen the motion as previously stated.

It may now be seen that a change in the angularity of the wabble plate alters the throw of the rods 49 and hence the stroke of the claws 33. Thus, for a constant velocity of the wabble plate or shaft 1, the speed of the driven shafts 9 and 72 may be varied. The number of ratios is infinite as a result of the infinite number of available positions of the wabble plate. The motion translating mechanism between the wabble plate and the oscillating claws 33 is extremely simple, consisting merely of a rod 29 and its two specified pivotal mountings at both ends. By the use of a plurality of claws with their connections to the wabble plate, the flow of power from the wabble plate to the disk 20 approaches a continuous condition.

Although a specific embodiment of the invention has been illustrated and described, it will be understood that various alterations in the details on construction may be made without departing from the scope of the invention as indicated by the appended claims.

What I claim is:
1. In an infinitely variable transmission, a drive shaft, a wabble plate thereon, a driven shaft mounted at 180 degrees to the drive shaft, a fixed disk on the driven shaft, a driving claw rotatably mounted on said driven shaft and engaging said disk, a connection between said plate and claw for oscillating the latter on said disk, means for varying the angle of said plate to said drive shaft, and means for releasing said claw from driving engagement with said disk in one direction.

2. In an infinitely variable transmission, a drive shaft, a wabble plate thereon, a driven shaft mounted at 180 degrees to the drive shaft, a disk fixed on the driven shaft, a support rotatably mounted on said driven shaft, a driving claw having a swivel mounting on said support and engaging said disk, a connecting rod extending from said plate to said support, means for varying the angle of said plate to said drive shaft, and means for releasing said claw from driving engagement with said disk in one direction.

3. In an infinitely variable transmission, a drive shaft, a wabble plate thereon, a driven shaft, a disk fixed thereon, a support rotatably mounted on said driven shaft, a driving claw having a swivel mounting on said support and engaging said disk, a connecting rod having a direct pivotal attachment to said plate on a radial axis and to said support, means for varying the angle of said plate to said drive shaft, and means for releasing said claw from driving engagement with said disk in one direction.

4. In an infinitely variable transmission, a drive shaft, a wabble plate thereon, a driven shaft, a disk fixed thereon, a support rotatably mounted on said driven shaft, a driving claw having a swivel mounting on said support and engaging said disk, a connecting rod having a direct pivotal attachment to said plate and said support, the axes of said attachments intersecting at the center of said plate, means for varying the angle of said plate to said drive shaft, and means for releasing said claw from driving engagement with said disk in one direction.

5. In an infinitely variable transmission, a drive shaft, a wabble plate thereon, a driven shaft, a disk fixed thereon, a support rotatably mounted on said driven shaft, a driving claw having a swivel mounting on said support and engaging said disk, a connecting rod having a direct pivotal attachment to said plate and said support, the axes of said attachments intersecting at a right angle at the center of said plate, means for varying the angle of said plate to said drive shaft, and means for releasing said claw from driving engagement with said disk in one direction.

6. In an infinitely variable transmission, a drive shaft, a wabble plate thereon, a driven shaft, a disk fixed thereon, a support rotatably mounted on said driven shaft, a driving claw having a swivel mounting on said support and engaging said disk, a connecting rod having a direct pivotal attachment to said plate and said support, the axes of said attachments intersecting at a right angle at the center of said plate, the axis of the pivotal attachment to said plate being radial of the plate, means for varying the angle of said plate to said drive shaft, and means for releasing said claw from driving engagement with said disk in one direction.

7. In an infinitely variable transmission, a drive shaft, a wabble plate thereon, a driven shaft mounted at 180 degrees to the drive shaft, a disk fixed on the driven shaft, a support rotatably mounted on said driven shaft, said claw having a slot receiving the periphery of said disk, a connecting rod extending from said plate to said support, means for varying the angle of said plate to said drive shaft, and means for releasing said claw from driving engagement with said disk in one direction.

8. In an infinitely variable transmission, a drive shaft, a wabble plate thereon, a driven shaft, a disk fixed thereon, a support rotatably mounted on said driven shaft, said claw having a slot receiving the periphery of said disk, a connecting rod having a direct pivotal attachment to said plate and said support, the axes of said attachments intersecting at a right angle at the center of said plate, means for varying the angle of said plate to said drive shaft, and means for releasing said claw from driving engagement with said disk in one direction.

9. In an infinitely variable transmission, a drive shaft, a wabble plate thereon, a driven shaft, a disk fixed thereon, a support rotatably mounted on said driven shaft and engaging said disk, a driving claw having a swivel mounting on said support and engaging said disk, a connecting rod having a direct pivotal attachment to said plate and said support, means for varying the angle of said plate to said drive shaft, means for releasing said claw from driving engagement with said disk in one direction, and means for guiding the point of pivotal attachment to said plate in an arc lying in a plane lengthwise of said shaft.

10. In an infinitely variable transmission, a drive shaft, a wabble plate thereon, a driven shaft, a disk fixed thereon, a support rotatably mounted on said driven shaft, a driving claw having a swivel mounting on said support and engaging said disk, a connecting rod having a direct pivotal attachment to said plate and said support, means for varying the angle of said plate to said drive shaft, and means for releasing said claw from driving engagement with said disk in one direction, a link having one end pivotally attached to said plate on a common axis with said rod, and a fixed arbor mounted perpendicular to said drive shaft, the other end of said link being pivotally mounted on said arbor.

11. In an infinitely variable transmission, a drive shaft, a wabble plate thereon, a driven shaft, a disk fixed thereon, a support rotatably mounted on said driven shaft, a driving claw having a swivel mounting on said support and engaging said disk, a connecting rod having a direct pivotal attachment to said plate and said support, means for varying the angle of said plate to said drive shaft, means for releasing said claw from driving engagement with said disk in one direction, a link having one end pivotally attached to said plate on a common axis with said rod, and a fixed arbor mounted perpendicular to said drive shaft and directed towards the center of said plate, the other end of said link being pivotally mounted on said arbor.

12. In an infinitely variable transmission, a drive shaft, a wabble plate thereon, a driven shaft mounted at 180 degrees to the drive shaft, a fixed disk on the driven shaft, a plurality of claws rotatably mounted on said driven shaft and engaging said disk, a connection between said plate and each claw for oscillating the latter on said disk, means for varying the angle of said plate to said drive shaft, and means for releasing said claw from driving engagement with said disk in one direction.

13. In an infinitely variable transmission, a drive shaft, a wabble plate thereon, a driven shaft mounted at 180 degrees to the drive shaft, a disk fixed on the driven shaft, a plurality of supports rotatably mounted on said driven shaft adjacent to said disk, a claw pivotally mounted on each support and engaging said disk, a connecting rod having a direct pivotal attachment to said plate on a radial axis and to said support, means for varying the angle of said plate to said drive shaft, and means for releasing said claw from driving engagement with said disk in one direction.

14. In an infinitely variable transmission, a drive shaft, a wabble plate thereon, a driven shaft, a disk fixed thereon, a plurality of supports rotatably mounted on said driven shaft adjacent to said disk, a claw pivotally mounted on each support and engaging said disk, a connecting rod having a direct pivotal attachment to said plate and said support, the axes of said attachments intersecting at a right angle at the center of said plate, means for varying the angle of said plate to said drive shaft, and means for releasing said claw from driving engagement with said disk in one direction.

15. In an infinitely variable transmission, a drive shaft, a wabble plate thereon, a driven shaft, a disk fixed thereon, a plurality of supports rotatably mounted on said driven shaft adjacent to said disk, a claw pivotally mounted on each support and engaging said disk, a connecting rod having a direct pivotal attachment to said plate and said support, means for varying the angle of said plate to said drive shaft, means for releasing said claws from driving engagement with said disk in one direction, and means for guiding the pivotal attachments of said rods to said plate in arcs lying in planes lengthwise of said drive shaft.

16. In an infinitely variable transmission, a drive shaft, a wabble plate thereon, a driven shaft mounted at 180 degrees to the drive shaft, a disk fixed on the driven shaft, a plurality of supports rotatably mounted on said driven shaft adjacent to said disk, a claw pivotally mounted on each support, each claw having a slot receiving the periphery of said disk, a connecting rod having a direct pivotal attachment to said plate on a radial axis and to said support, means for varying the angle of said plate to said drive shaft, and means for releasing said claw from driving engagement with said disk in one direction.

17. In an infinitely variable transmission, a drive shaft, a wabble plate thereon, a driven shaft, a disk fixed thereon, a plurality of supports rotatably mounted on said driven shaft adjacent to said disk, a claw pivotally mounted on each support, each claw having a slot receiving the periphery of said disk, a connecting rod having a direct pivotal attachment to said plate and said support, means for varying the angle of said plate to said drive shaft, means for releasing said claws from driving engagement with said disk in one direction, and means for guiding the pivotal attachments of said rods to said plate in arcs lying in planes lengthwise of said drive shaft.

18. In an infinitely variable transmission, a drive shaft, a wabble plate thereon, a driven shaft, a disk fixed thereon, a plurality of supports rotatably mounted on said driven shaft adjacent to said disk, a claw pivotally mounted on each support, each claw having a slot receiving the periphery of said disk, a connecting rod having a direct pivotal attachment to said plate and said support, means for varying the angle of said plate to said drive shaft, means for releasing said claws from driving engagement with said disk in one direction, a plurality of links each having one end pivotally attached to said plate on a common axis with one of said rods, a plurality of fixed arbors mounted perpendicular to said drive shaft and directed toward the center of said plate, the remaining ends of said links being respectively pivotally mounted on said arbor.

EDWARD W. SPECK.